INVENTOR
*Hans Rudolph*

INVENTOR
Hans Rudolph

March 15, 1966 H. RUDOLPH 3,240,877

STABILIZING UNSTABLE SYNCHRONIZING PHASE POSITIONS IN RECEIVERS OF SYNCHRONOUSLY OPERATING TELEGRAPH SYSTEMS

Filed Sept. 1, 1961 5 Sheets-Sheet 5

INVENTOR
Hans Rudolph

United States Patent Office
3,240,877
Patented Mar. 15, 1966

3,240,877
STABILIZING UNSTABLE SYNCHRONIZING PHASE POSITIONS IN RECEIVERS OF SYNCHRONOUSLY OPERATING TELEGRAPH SYSTEMS

Hans Rudolph, Munich-Solln, Germany, assignor to Siemens & Halske Aktiengesellschaft, Berlin and Munich, Germany, a corporation of Germany
Filed Sept. 1, 1961, Ser. No. 135,551
Claims priority, application Germany, Sept. 7, 1960, S 70,246
7 Claims. (Cl. 178—69.5)

This invention is concerned with a method of and a circuit arrangement for stabilizing unstable synchronizing phase positions in receivers of synchronously operating telegraph systems.

The various objects and features of the invention will be brought out in the course of the description which will be presently rendered with reference to the accompanying drawings.

Figure 3:
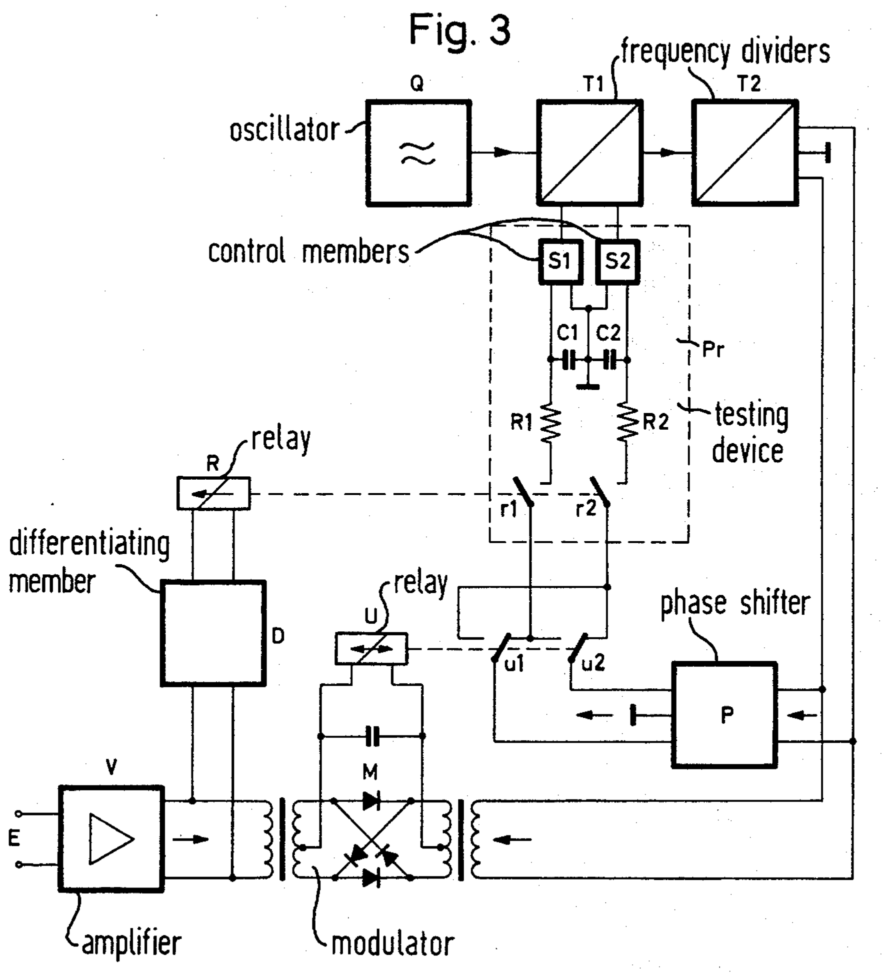
FIG. 3 represents a first advantageous embodiment of the invention.
Figure 5:
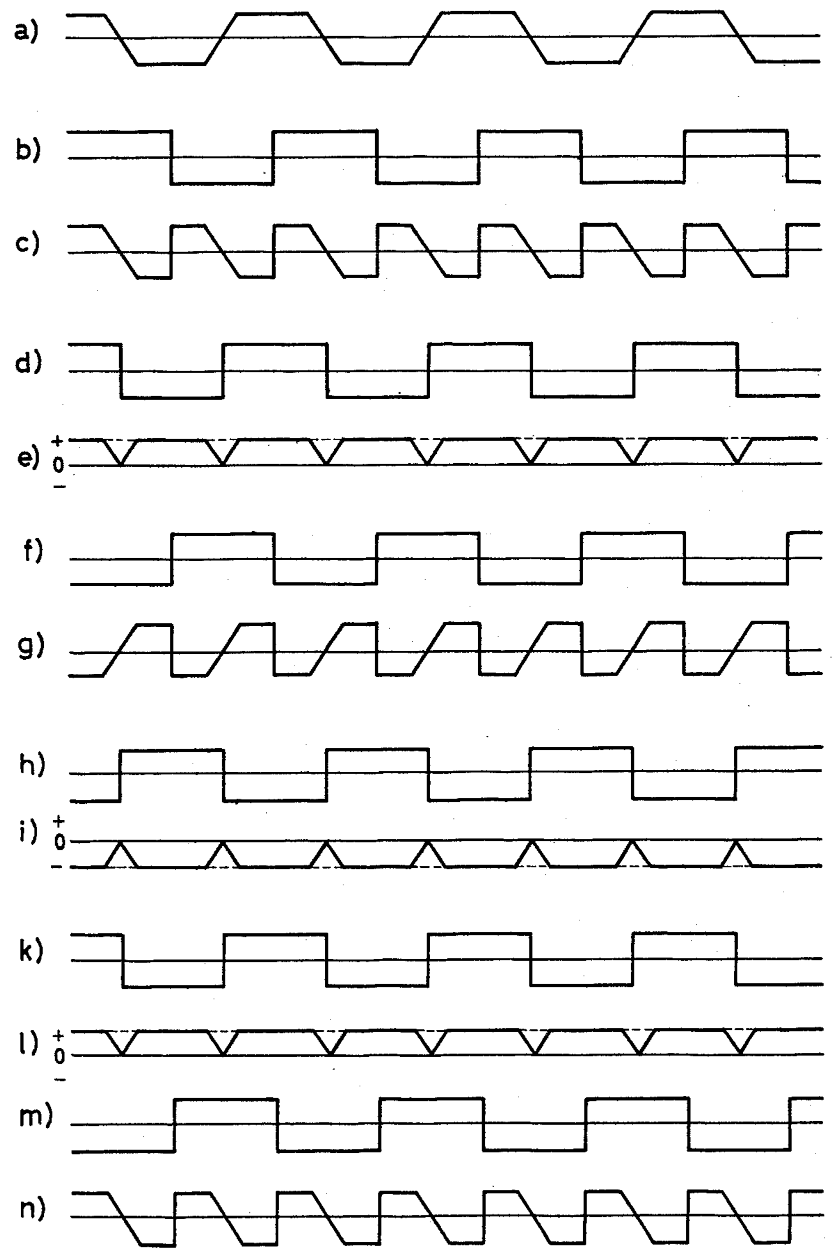
Figure 6:
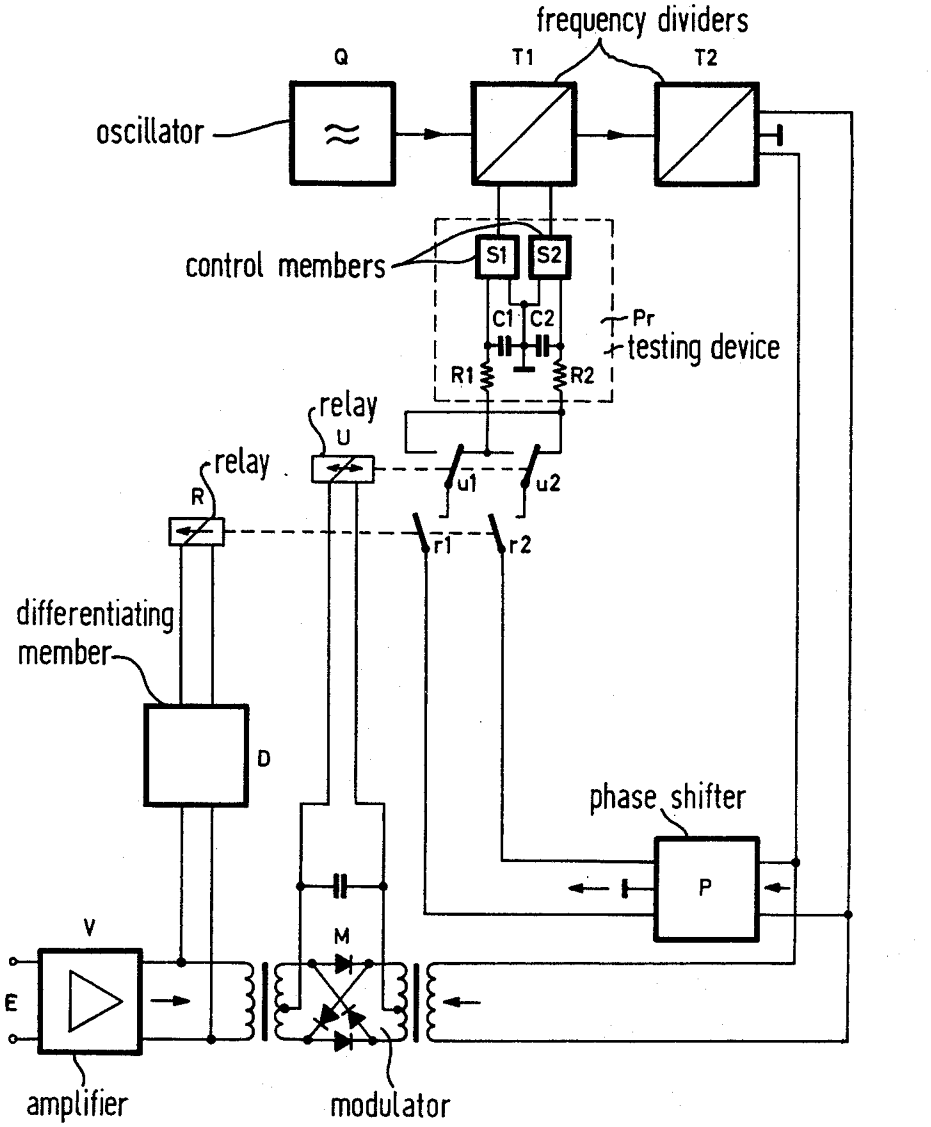

FIG. 5 indicates the course of impulses to be considered in connection with the invention; and FIG. 6 illustrates a modification of the embodiment illustrated in FIG. 3.

In a synchronously operating telegraph system, the transmitter and the receiver devices must operate in synchronism as to frequency and phase so as to permit at the receiver correct evaluation of the transmitted telegraph symbols. It is for this purpose necessary to transmit synchronizing signals incident to the transmission of messages or to derive such signals from the received telegraph symbols.

It is known to derive for this purpose at the receiver synchronizing impulses from the element changes of the transmitted telegraph symbols, to compare these impulses with an alternating voltage of twice the element frequency, which is rigidly in phase with the distributor operation of the receiver, and to obtain from the comparison, upon gaining or lagging receiving operation, a regulation voltage which is applied for appropriate corrective regulation of the operating phase of the receiver device. This procedure has various disadvantages.

One disadvantage results from the continuous transmission of the pause signal $\alpha$ or $\beta$, which is respectively transmitted during message transmission pauses, depending upon operating requirements in connection with symbols coded in the 7-element code. In case all elements of a symbol are simultaneously transmitted parallel over seven partial channels, there will not occur an element change in any of these channels. Accordingly, no synchronizing pulses can be derived, and the synchronizing phase is after a prolonged interval lost. This drawback can be avoided in known manner by the provision of an auxiliary synchronizing channel over which a synchronizing frequency is continuously transmitted for the element sampling.

Another drawback of this system will now be explained with reference to FIG. 1.

Figure 1:
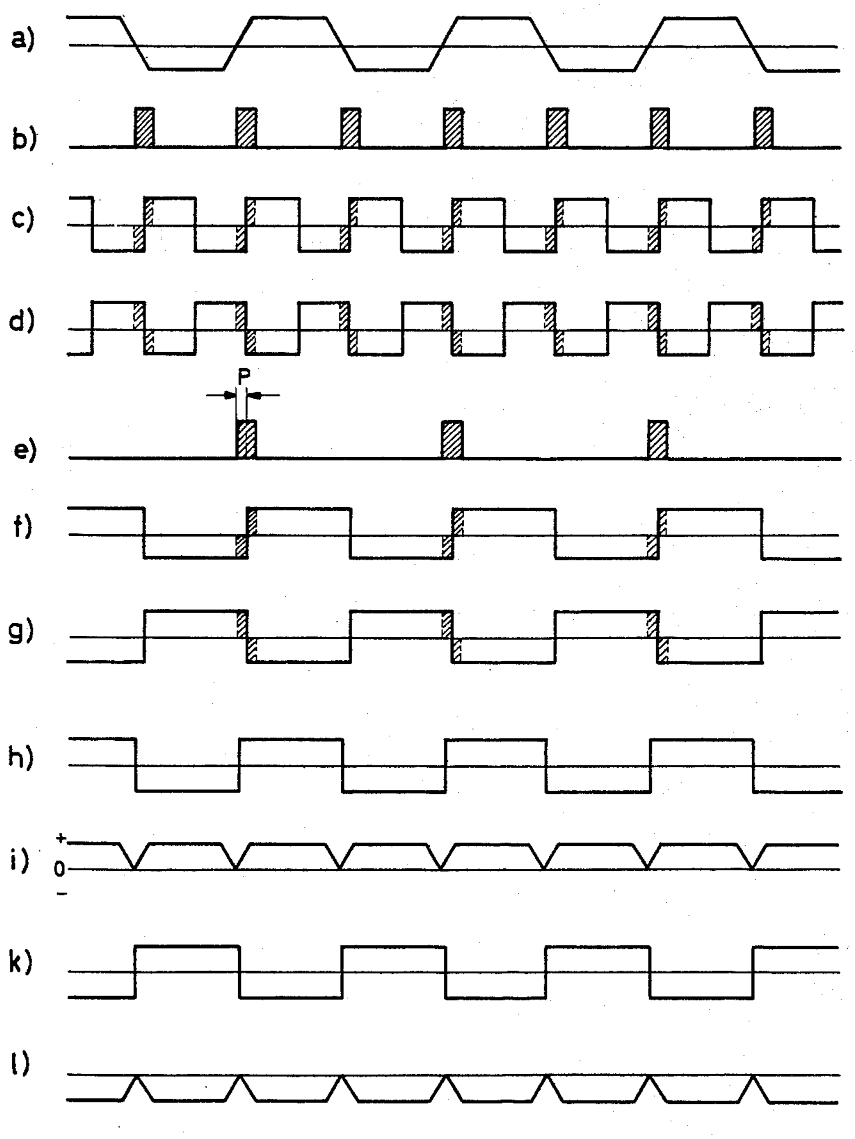
FIG. 1 shows the relative course of impulses occurring in a known synchronizing system to aid in explaining the drawbacks thereof.

From the flanks or from the zero passages of the synchronizing frequency, shown in line *a*) in FIG. 1 in simplified form as trapezoidal, which is transmitted from the transmitter to the receiver, are derived impulses which are rectified and extended or shaped to form suitable synchronizing impulses shown in line *b*). Line *c*) shows the rectangular voltage which is synchronous and rigidily in phase with the operation of the receiver distributor or, in an electronic embodiment, rigidly in phase with the element sampling operations. This rectangular voltage of line *c*) is to be compared with the synchronizing impulses of line *b*) and is to be corrected if necessary.

Figure 2:
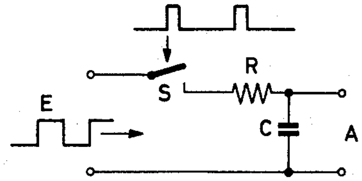
Fig. 2 PRIOR ART
FIG. 2 illustrates a phase comparison device.

The phase comparison is carried out, for example, with the aid of a device indicated in FIG. 2. The switch S, which may be an electronic switch is for simplification shown as a mechanical switch, is always briefly closed for the duration of a synchronizing impulse. The rectangular voltage is conducted to the input E. During the closure time of the switch S, which in the case of correct phase position of the receiver distributor substantially coincides with the rising flank of the rectangular voltage, there will first flow a negative and thereafter a positive current over the resistor R to the capacitor C. Accordingly, averaged over an extended interval, there will not be produced a charge on the capacitor C.

If the distributor operation gains, resulting in shifting somewhat to the right of the rectangular voltage according to FIG. 1, line *b*), there will after each synchronizing impulse remain a negative residual charge on the capacitor, such charge gradually accumulating. The synchronizing operation is released as soon as the voltage on the capacitor reaches the energizing value of a control member, such synchronizing operation being effective to shift the phase position of the rectangular voltage by a small amount to the left, thereby reducing or completely cancelling the phase error. The capacitor is at the same time discharged.

A positive voltage is in the case of a lagging phase error in similar manner formed at the capacitor C, such voltage accumulating and, upon reaching the energizing value of a control member, causing such member to effect a synchronizing operation in opposite direction.

In case the phase error is considerable, which might happen particularly upon starting the operation of a system, it will be necessary to apply for the correction thereof a plurality of successive identically directed synchronizing operations.

It is however also possible that a disturbance occurs causing a phase error which amounts to exactly one-half element duration. The rectangular voltage has in such a case the phase position shown in line *d*) of FIG. 1. As will be seen, the capacitor C remains in such case on the average likewise without a charge. The distributor is thereby in an unstable phase position, since a regulation is responsive to deviations effected in exactly opposite direction as compared with the phase position of the distributor according to line *c*) in FIG. 1. However, this unstable phase position can with highly constant, for example, quartz controlled distributor rotation persist for a long time. Small deviations of the phase position shown in line *d*) may not suffice to effect the release of synchronizing operations, since the voltage at the capacitor does not reach the energizing value of the control member responsive to such small deviations. It is clear that the message received is necessarily falsified in the presence of such erroneous phase position of the distributor.

It is now possible to reduce the comparison rectangular voltage to half the frequency and to derive the synchronizing impulses only from each second zero passage of the synchronizing frequency; see FIG. 1, line *e*) and *f*). The message is in such case correctly received even when the phase position of the rectangular voltage is shifted by one-half period; see FIG. 1, line *g*). The distributor rotation thereby takes place displaced by one symbol, which is however unimportant. It may happen, however, that the unstable condition is, for example, owing to disturbances, nullified. Synchronizing operations will then set in, which persist for a relatively long time, since it is, as previously explained, required to apply very many synchronizing operations so as to restore the stable phase position according to FIG. 1, line *f*). Telegraph symbols can be received falsified for the duration of these synchronizing operations.

The object of the present invention is to avoid these drawbacks, that is, the unstable synchronizing phases which are as such permissible, shall be stabilized, so as to avoid the prolonged synchronizing operations resulting upon disruption of the unstable synchronizing phase position.

In accordance with the invention, this object is realized by effecting the regulation of the operation or rotation phase in the direction of the synchronizing phase which is nearest to the momentarily present phase position.

In a system in which the regulation voltages for the regulation of the rotation phase position of the receiver device are derived from the comparison of synchronizing impulses occurring periodically with twice the telegraph element spacing, with an alternating reference voltage which is rigidly in phase with the rotation of the receiver device and the period of which is equal to the spacing of the synchronizing impulses, and wherein respectively a stable or a further unstable synchronizing phase of the alternating reference voltage and therewith of the rotation phase of the receiver device, at which no regulation voltages appear, is present when the zero passages of the alternating reference voltage are in one direction effected exactly in the center of the synchronizing impulses, while there occur, responsive to deviations, regulation voltages of different polarity which effect a regulation in the direction of the stable synchronizing phase position, the regulation voltage or the alternating reference voltage is for this purpose changed in polarity when the spacing of the synchronizing impulses from the unstable synchronizing phase position is smaller than the spacing thereof from the stable synchronizing phase position.

In another system, in which a first regulation voltage for the regulation of the synchronizing phase of the receiver device is obtained by comparing, as to phase and frequency, a transmitted alternating synchronizing voltage with an alternating reference voltage of the same frequency, which is rigidly in phase with the rotation of the receiver device, and wherein there occur in two phase positions which differ by 180°, a stable and an unstable synchronizing phase position at which no regulation voltages appear, the stabilization of the unstable synchronizing phase is obtained by comparison of an alternating voltage which is phase shifted, preferably by 90°, with respect to the alternating refrence voltage, with the alternating synchronizing voltage, thereby obtaining a second regulation voltage which is responsive to changing polarity effective to change the polarity of the first regulation voltage.

Referring now to FIG. 3, which shows a first advantageous embodiment of the invention, the received alternating synchronizing voltage according to FIG. 1, line *a*) is conducted to the input E of the amplifier V for suitable amplification thereof. The flanks are differentiated in a differentiating member D to form the positive impulses represented in line *e*) of FIG. 1. These impulses actuate the relay R which closes its contacts *r*1 and *r*2 for the duration of the respective impulses.

The rectangular alternating voltage with a frequency corresponding to that of the alternating synchronizing voltage which is conducted to the input E, which is required for the phase comparison, is derived from the quartz controlled highly constant oscillator Q. The frequency divider stages T1 and T2 divide the oscillator frequency as required to produce the necessary alternating rectangular voltage. The output voltage of the frequency divider T2 is indicated in line *h*) of FIG. 1. If required, a small phase correction may be effected in the phase shifter P. In the case of correct rotation phase position of the receiver device, two complementary rectangular voltages indicated in FIG. 1, lines *f*) and *g*), will appear at the output of the phase shifter P. These complementary rectangular voltages are over the polarity changing contacts *u*1 and *u*2 extended to the impulse controlled contacts *r*1 and *r*2, and the capacitors C1 and C2 are accordingly, during the closure times of the contacts *r*1 and *r*2, negatively or positively charged over the resistors R1 and R2, depending upon the phase position of the rectangular voltage. Assuming the phase position to be correct, there will not be produced a charge, averaged over a prolonged time, since the negative and positive charges effect a cancelling out. The charging of the capacitor C1 corresponds to the shaded areas in line *f*) of FIG. 1 and the charges on the capacitor C2 are similarly indicated in line *g*) of FIG. 1.

In the case of gaining rotation phase position of the receiver device (shifting to the right of the rectangular voltages, FIG. 1, lines *f*) and *h*)), the negative charge will accordingly predominate in the capacitor C1 while the positive charge will predominate in the capacitor C2. When the positive charge on the capacitor C2 reaches the energizing value of the control member S2, the latter will become operative to affect the frequency divider T1 such, for example, that the division ratio thereof is for a short interval increased. This shifts, after the further frequency division in the frequency divider T2, the rectangular voltage in its phase position somewhat to the left, in the sense of a correction of the phase error. The negative charging of the capacitor C1 remains without effect, since the two control members S1 and S2 respond operatively only to positive voltages of predetermined minimum magnitude.

In the event that the receiver device exhibits a lagging rotation phase (shifting to the left, of the rectangular voltages, FIG. 1, line *f*), *g*) and *h*)), the capacitor C1 will accumulate a positive charge and the capacitor C2, a negative charge. Upon exceeding the threshold value, the control member S1 will operatively energize and will cause the frequency divider T1 to temporarily reduce its normal division ratio, thereby effecting the shifting of the phase position of the rectangular voltages, FIG. 1, lines *f*) and *g*) somewhat to the right. The capacitors C1 and C2 are discharged after each phase correction.

In case the rotation phase of the receiver device is phase shifted by a whole element corresponding to a half period of the rectangular voltages according to lines *f*), *g*) and *h*) of FIG. 1, which might happen upon starting the operation of the system, the capacitor C1 would be during the closure time of the contact *r*1 affected by a rectangular voltage with the phase position according to line *g*) of FIG. 1, while the capacitor C2 would be affected over the contact *r*2 by the phase position according to line *f*) of FIG. 1. No charging of the capacitors C1 and C2 would be effected by averaging at this phase position. However, if this phase position should be shifted to the right, for example, responsive to some disturbance, there would accumulate a positive voltage on the capacitor C1 and a negative voltage on the capacitor C2. Upon exceeding the threshold value, the control member S1 would energize and effect in the previously described manner a further shifting of the rectangular voltage to the right. These phase corrections would be continued until stable rotation phase is obtained which is shifted by one element length.

In order to avoid these regulation operations from the unstable to the stable synchronizing phase position, there is provided a ring modulator M and the pole changing device U controlled thereby. To the left input of the ring modulator M is conducted the alternating synchronizing voltage of line *a*) of FIG. 1 and to the right input thereof is conducted the alternating reference voltage from the frequency divider T2, represented in line *h*) of FIG. 1. Since these voltages are initially in phase there will appear at the output of the ring modulator M a positive direct voltage represented in line *i*) in FIG. 1, which is operative to hold the relay U with its contacts $u1$ and $u2$ in the positions in which they are shown in FIG. 3.

If the rotation phase of the receiver device is phase shifted by a whole element, that is, by 180°, FIG. 1, line $k$), the rectangular voltage supplied by the frequency divider T2 will be in opposing phase with respect to the alternating synchronizing voltage conducted to the input E. The output voltage of the ring modulator M is in such case negative, see last line $l$) of FIG. 1, and the relay U places its contacts $u1$ and $u2$ into alternate positions. This effects a pole changing of the rectangular voltages conducted to the capacitors C1 and C2, so that a rectangular voltage according to line $f$), FIG. 1, is again conducted to the capacitor C1 while a rectangular voltage according to line $g$) of FIG. 1 is conducted to the capacitor C2. The change of polarity accordingly secures the stability of the synchronization even with respect to the previously unstable synchronizing phase.

If the rotation phase of the receiver device is wrong by one half element, the rectangular voltage given off from the frequency divider T2 will be phase shifted by 90° with respect to the alternating synchronizing voltage. The ring modulator M will in this case not deliver a direct voltage. The operation of the pole changing device U is such that it can be only in one or the other position; it remains in the position in which it happens to be and thereby determines the direction in which the synchronization is to take place. Accordingly, an unstable condition is excluded.

Figure 4:
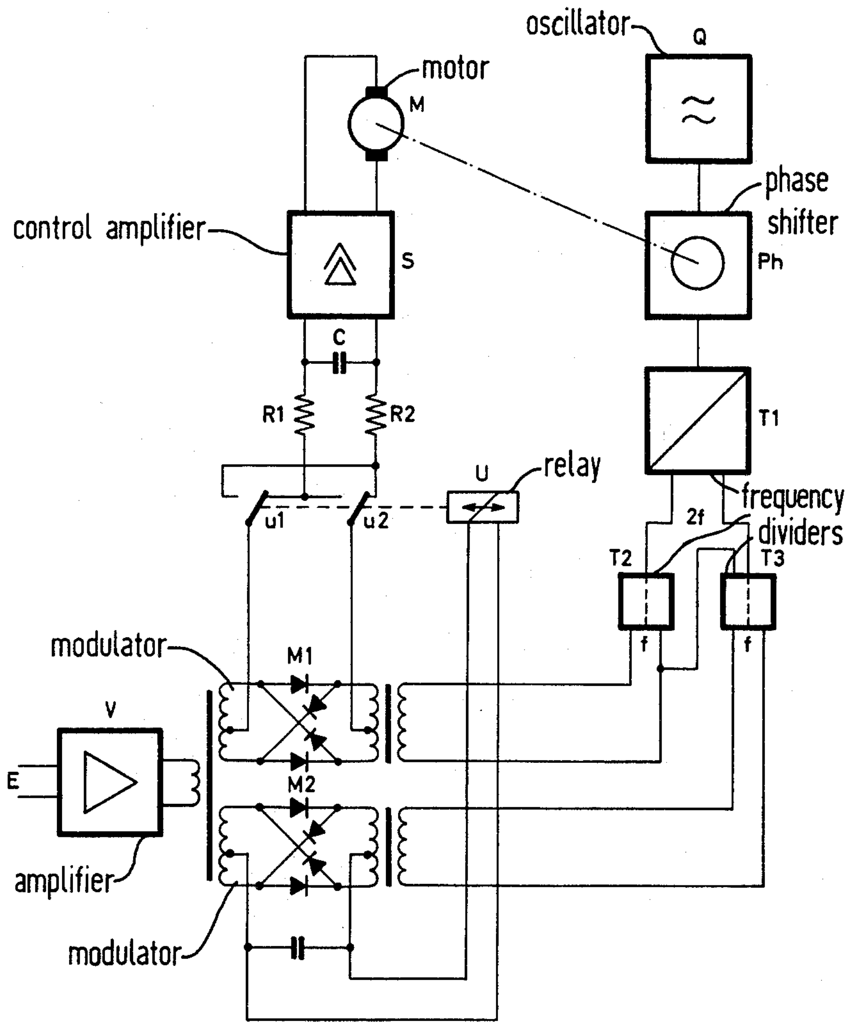
FIG. 4 shows a second embodiment.

FIG. 4 shows a second advantageous embodiment of the invention. The highly constant oscillator Q produces an alternating voltage which passes through the adjustable phase shifter Ph to the frequency divider T1 in which it is divided to form the frequency $2f$. From the frequency divider T1 are taken two voltages of opposite phase, that is, voltages of the frequency $f$ which are phase shifted by 180° and these voltages are conducted to two frequency reducers T2 and T3 in which the frequency is reduced to one-half, thereby also reducing the phase angle difference to one-half, that is, to 90°. The coupling between the two frequency dividers T2 and T3 assures that the phase position of the two voltages which had been divided to the frequencies $f$ are in mutually fixed relationship. Accordingly, the rectangular voltages given off from the frequency dividers T2 and T3 are mutually phase shifted by 90°.

The incoming alternating synchronizing voltage, indicated in line $a$) of FIG. 5, is conducted to the input E (FIG. 4). Such voltage is amplified in the amplifier V and conducted to the two left inputs of the ring modulators M1 and M2. To the other inputs of these modulators are conducted the output voltages of the frequency dividers T2 and T3, respectively. The direct voltage part given off by the modulators is proportional to the cosine of the phase angle difference between the two alternating voltages conducted thereto.

Assuming the rotation phase position of the receiver device to be correct, the modulator M1 will receive from the frequency divider T2 a rectangular voltage according to line $b$) of FIG. 5. The phase angle difference with respect to the alternating synchronizing voltage according to line $a$), FIG. 5, amounts thereby to 90°, and the voltage given off from the modulator M1 does not contain a direct voltage part according to line $c$) of FIG. 5. The alternating voltage part of the output voltage of the modulator M1 which is extended over the pole changing contacts $u1$ and $u2$, is eliminated in a filter member comprising the resistors R1 and R2 and the capacitor C, and the control amplifier S therefore does not receive any voltage. It is assumed in this connection that the control amplifier S is suitable for amplifying voltages of any desired polarity and that its output voltage, which may be present, serves for driving a motor M which is operative for adjusting or regulating the phase shifter Ph, thereby equalizing a phase error.

The rectangular voltage (line $d$) in FIG. 5) which is conducted to the modulator M2 from the frequency divider T3, is in phase with the synchronizing alternating voltage (line $a$) in FIG. 5), and at the output of the modulator M2 will appear a positive voltage (line $e$) in FIG. 5) which energizes the relay U so that the contacts $u1$ and $u2$ thereof are held in the positions in which they are shown in FIG. 4.

Likewise, the control amplifier S will not receive any regulation voltage if the rotation phase of the receiver device is with respect to the alternating synchronizing voltage shifted by the amount of one whole element. This would be an unstable phase condition, as has been explained in equivalent manner in connection with the embodiment illustrated in FIG. 3, were it not for the fact that the modulator M2, owing to the voltages of opposed phase (lines $h$) and $a$) of FIG. 5), now delivers a negative direct voltage which energizes the relay U in opposite direction so that its contacts $u1$ and $u2$ assume alternate positions, thereby oppositely poling the regulation voltage given off by the modulator M1 in the presence of phase errors. The rotation phase position of the receiver device is thus held stable in this second correct phase position.

FIG. 5 also shows in lines $k$) to $n$) the conditions resulting in the case of a phase error in the amount of one-half of an element (90°). The course of the output voltage of the frequency divider T2 then corresponds to that shown in line $k$) and is in phase with the alternating synchronizing voltage according to line $a$) in FIG. 5. At the output of the modulator M1 appears the maximum positive regulation voltage. The phase must now in any case be readjusted by 90° by the operation of the motor M. It is immaterial whether the phase is thereby advanced or retarded by this amount. The direction in which the adjustment is effected depends upon the positions in which the contacts $u1$ and $u2$ happen to be, the relay U which controls these contacts being in such case without current, since it does not receive any voltage from the modulator M2 owing to the fact that the alternating synchronization voltage (line $a$) in FIG. 5) is by 90° displaced with respect to the voltage (line $m$) in FIG. 5) which is given off by the frequency divider T3.

It is of course understood that, in the embodiments according to FIGS. 3 and 4, a stabilization of the unstable synchronization phase position could in case of a phase displacement by an amount greater than half an element length, also be obtained by pole-changing the regulating voltage or the received alternating synchronization voltage instead of pole-changing the alternating reference voltage.

FIG. 6 illustrates a circuit which, with the exception of the pole changing circuit, is identical with that of FIG. 3. In FIG. 6, however, the polarity of the regulating voltage is changed instead of the alternating reference voltage.

If desired, the embodiments disclosed herein can be constructed substantially wholly electronically, that is, for example, the relays shown in the drawings and contacts controlled thereby can be replaced by functionally equivalent electronic devices.

Changes may be made within the scope and spirit of the appended claims which define what is believed to be new and desired to have protected by Letters Patent.

I claim:

1. A circuit arrangement for stabilizing unstable synchronizing phases at the receiver devices of synchronously operating telegraph systems, comprising a modulator for receiving an alternating reference voltage and an alternating synchronizing voltage of identical frequency, a testing device, a pole changing device controlled by the output voltage of said modulator in accordance with the polarity of said output voltage for conducting to said testing device the alternating reference voltage and a voltage complementary thereto, and means for totalling up the currents and voltages respectively conducted thereto incident to and for the duration of synchronizing impulses derived from the alternating synchronizing voltage and effecting upon exceeding a minimum value alteration of the phase position of the alternating reference voltage in one or the other direction.

2. A circuit arrangement according to claim 1, comprising switching means in said testing device which are closed for the duration of the respective synchronizing signals, and an RC-voltage divider cooperating with the respective switching means for receiving thereover the alternating reference voltage and the voltage complementary thereto which are extended over said pole changing devices.

3. A circuit arrangement according to claim 2, comprising a switch cooperating with each RC-voltage divider, said switch energizing responsive to a voltage on the corresponding capacitor which exceeds a predetermined value and thereby altering the phase position of the alternating reference voltage.

4. A circuit arrangement for stabilizing unstable synchronizing phases at the receiver devices of synchronously operating telegraph systems, comprising two modulators for receiving an alternating synchronizing voltage and respectively the alternating reference voltage in which the reference alternating voltage fed to the first modulator is phase shifted by 90° with respect to the reference alternating voltage fed to the second modulator, the output voltage of one of said modulators controlling depending upon the polarity, a pole changing device for the regulation voltage delivered by the other modulator.

5. A circuit arrangement for stabilizing unstable synchronizing phases at the receiver devices of synchronously operating telegraph systems, comprising means for supplying an alternating reference voltage of identical frequency with the alternating synchronizing voltage of the received signals, means responsive to a regulating voltage for varying the phase of said alternating reference voltage, means for comparing said alternating synchronizing voltage with said reference voltage and a voltage complementary to the latter, operative to derive a regulating voltage which is applied to said phase varying means, and means operatively connected to the source of said alternating reference and synchronizing voltages operative to determine the polarity of the regulating voltage whereby the phase regulation takes place in the direction of the synchronizing phase position which is nearest to the momentarily present phase position.

6. A circuit arrangement as defined in claim 5, wherein said polarity determining means is operatively connected in the reference voltage circuit to vary the polarity of the alternating reference voltage applied to said comparison means.

7. A circuit arrangement as defined in claim 5, wherein said polarity determining means is operatively connected in the regulating voltage circuit to vary the polarity of the regulating voltage.

References Cited by the Examiner

UNITED STATES PATENTS 2,843,669 7/1958 Six et al. ---------- 178—69.5

DAVID G. REDINBAUGH, *Primary Examiner.*

ROY LAKE, *Examiner.*